United States Patent [19]

Powers, II

[11] Patent Number: 5,388,337
[45] Date of Patent: Feb. 14, 1995

[54] ANGLE ORIENTING LEVEL APPARATUS

[76] Inventor: William J. Powers, II, 10320 Escondido Cyn Rd., Agua Dulce, Calif. 91350

[21] Appl. No.: 72,120

[22] Filed: Jun. 7, 1993

[51] Int. Cl.⁶ .................... G01C 9/28; G01C 17/02
[52] U.S. Cl. ........................ 33/273; 33/349; 33/352; 33/382; 33/760; 33/354
[58] Field of Search ............... 33/272, 273, 351, 352, 33/353, 354, 364, 381, 382, 760, 768, 770, 349

[56] References Cited

U.S. PATENT DOCUMENTS

| | | | |
|---|---|---|---|
| 256,142 | 4/1882 | Hill | 33/272 |
| 825,217 | 7/1906 | Hull | 33/354 |
| 898,092 | 9/1908 | Carrier | 33/371 |
| 1,023,301 | 4/1912 | Davis | 33/349 |
| 1,098,381 | 6/1914 | Hartley | 33/381 |
| 1,188,158 | 6/1916 | De Tullio | 33/273 |
| 1,380,243 | 5/1921 | Osborn | 33/352 |
| 2,247,541 | 7/1941 | Adams | 33/349 |
| 2,358,589 | 9/1944 | Piffath | 33/272 |
| 2,482,688 | 9/1949 | Musal | 33/349 |
| 2,835,036 | 5/1958 | Peresenyi | 33/273 |
| 4,899,453 | 2/1990 | Bhat et al. | 33/272 |

FOREIGN PATENT DOCUMENTS

| | | | |
|---|---|---|---|
| 1487255 | 6/1967 | France | 33/381 |
| 0299974 | 7/1913 | Germany | 33/352 |

Primary Examiner—Thomas B. Will
Attorney, Agent, or Firm—E. Michael Combs

[57] ABSTRACT

A level includes a compass member fixedly mounted within the level, the level having spirit levels positioned on opposed sides of the compass, and the compass having a rotatable ring arranged to provide for angular deflection relative to a predetermined orientation.

4 Claims, 4 Drawing Sheets

ANGLE ORIENTING LEVEL APPARATUS

BACKGROUND OF THE INVENTION

1. Field of the Invention

The field of invention relates to level apparatus, and more particularly pertains to a new and improved angle orienting level apparatus arranged to provide for indication of angular deflection relative to a preset orientation.

2. Description of the Prior Art

Level structures of various types are utilized throughout the prior art in carpentry and the like, and compass members per se are also available. The instant invention provides for the permitting of angular deflection relative to a surface by the use of a compass member mounted within the level and the compass member having a ring rotatably oriented, having a ring scribe member to provide for indication of deflection relative to a preset or initial orientation of the compass structure and in this respect, the present invention substantially fulfills this need.

SUMMARY OF THE INVENTION

In view of the foregoing disadvantages inherent in the known types of level apparatus now present in the prior art, the present invention provides an angle orienting level apparatus wherein the same is arranged to include a compass member to indicate angular deflection of the level structure. As such, the general purpose of the present invention, which will be described subsequently in greater detail, is to provide a new and improved angle orienting level apparatus which has all the advantages of the prior art level apparatus and none of the disadvantages.

To attain this, the present invention provides a level including a compass member fixedly mounted within the level, the level having spirit levels positioned on opposed sides of the compass, and the compass having a rotatable ring arranged to provide for angular deflection relative to a predetermined orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved angle orienting level apparatus which has all the advantages of the prior art level apparatus and none of the disadvantages.

It is another object of the present invention to provide a new and improved angle orienting level apparatus which may be easily and efficiently manufactured and marketed.

It is a further object of the present invention to provide a new and improved angle orienting level apparatus which is of a durable and reliable construction.

An even further object of the present invention is to provide a new and improved angle orienting level apparatus which is susceptible of a low cost of manufacture with regard to both materials and labor, and which accordingly is then susceptible of low prices of sale to the consuming public, thereby making such angle orienting level apparatus economically available to the buying public.

Still yet another object of the present invention is to provide a new and improved angle orienting level apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
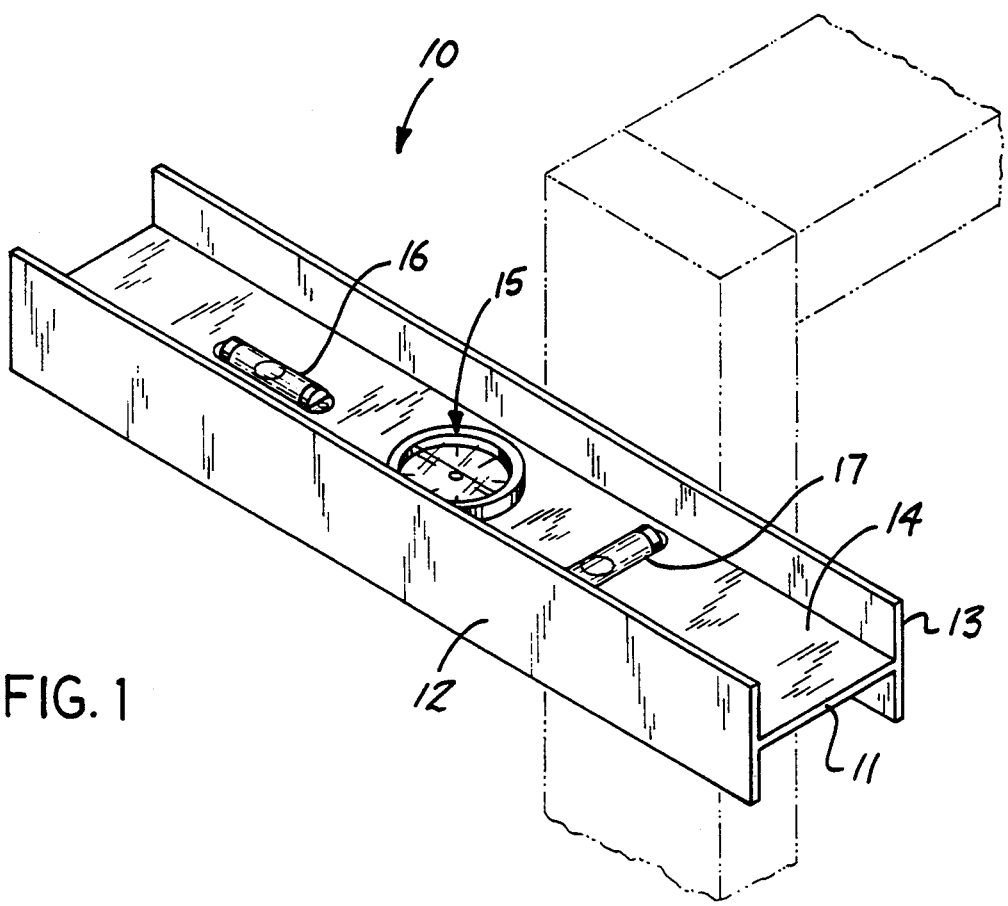
FIG. 1 is an isometric illustration of the invention.
Figure 2:
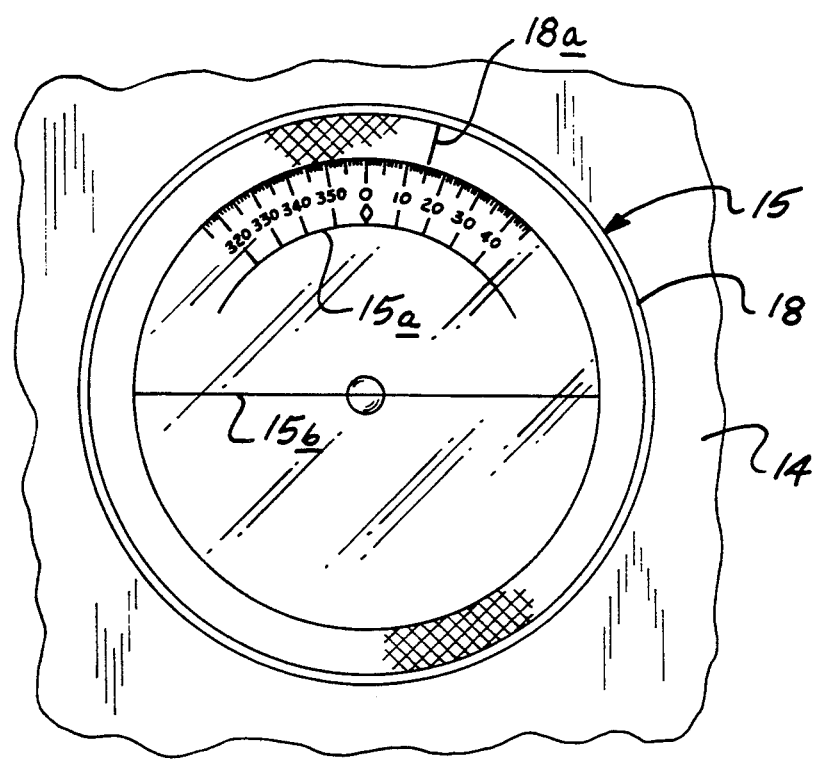
FIG. 2 is an orthographic top view of the compass structure.

With reference now to the drawings, and in particular to FIGS. 1 to 8 thereof, a new and improved angle orienting level apparatus embodying the principles and concepts of the present invention and generally designated by the reference numerals 10 and 10a will be described.

Figure 3:
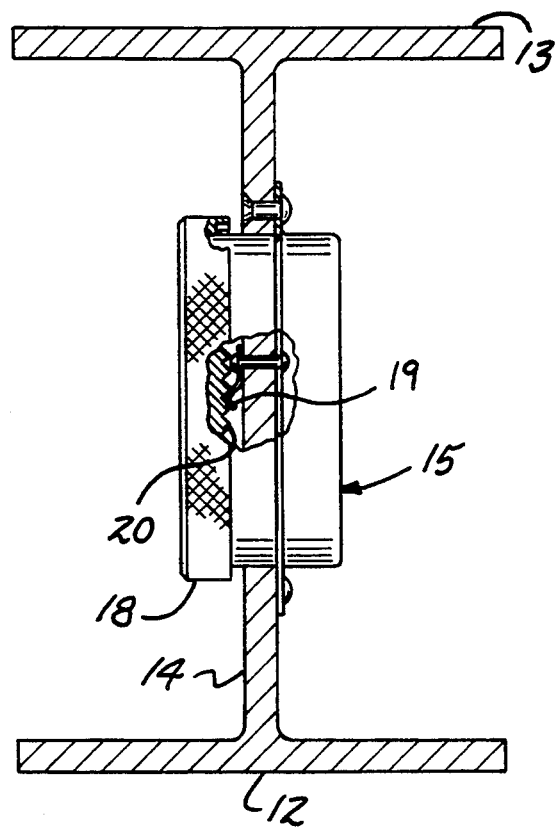
FIG. 3 is an orthographic cross-sectional illustration of the compass structure mounted within the level central web.
Figure 4:
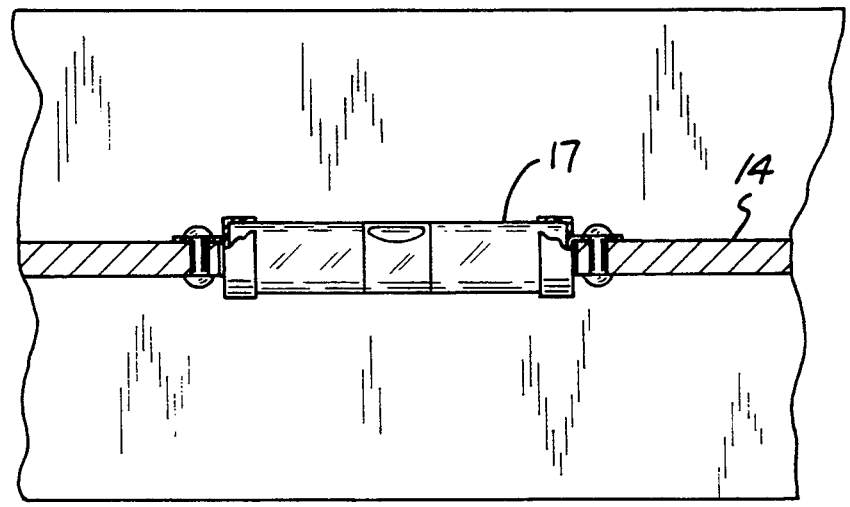
FIG. 4 is a cross-sectional illustration of mounting of the spirit level structure within the level central web.

More specifically, the level apparatus 10 of the instant invention essentially comprises a central web 11, having first and second wall flanges 12 and 13 mounted on opposed sides of the central web orthogonally of the central web, with the first and second wall flanges 12 and 13 orthogonally and medially intersected by the central web and are coextensive therewith. The central web has a central web top wall 14 and includes a compass housing 15 directed through the central web 11, in a manner as indicated in FIG. 3, with an outer housing ring 18 positioned above a central web top wall 14 rotatably mounted to the compass housing 15 that is fixedly secured to the central web 11. First and second spirit levels 16 and 17 are provided, with the first spirit level 16 oriented parallel and medially of the first and second wall flanges 12 and 13, with the second spirit lever 17 orthogonally oriented between the first and second wall flanges 12 and 13. The outer housing ring includes an annular array of housing ring teeth 20 coextensive with the ring and in a facing relationship to the web top wall 14, such that a spring leg plate 19 fixedly mounted to the top wall 14 extends therefrom and is directed between a plurality of the teeth 20 to maintain the ring in a positioned orientation upon manual displacement of the ring structure, such that the ring 18 includes a ring indicia member 18a radially directed of the housing 15 employed for providing for initial orientation of the compass reading of specifically the rotatable compass ring 15a relative to a compass lens mounted to the housing 15. The compass lens includes a lens indicia member 15b fixedly mounted parallel between the first and second wall flanges 12 and 13 for providing reference of the longitudinal alignment of the central web 11.

Figure 5:
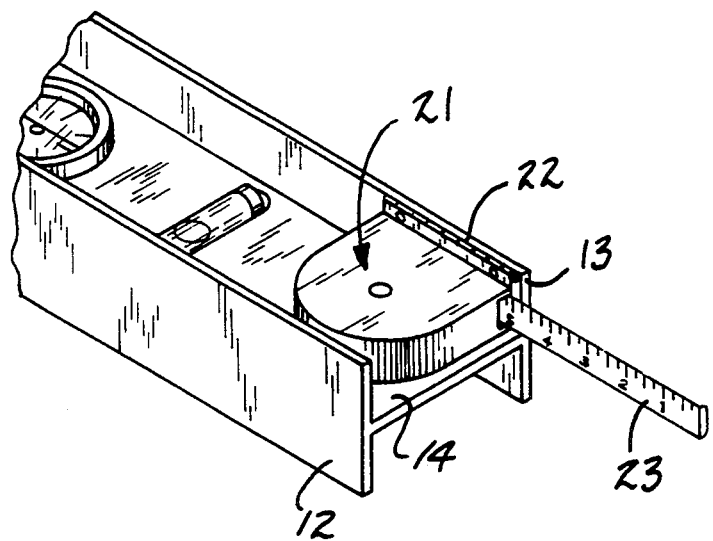
FIG. 5 is an isometric illustration of the level structure including a measuring rule.
Figure 6:
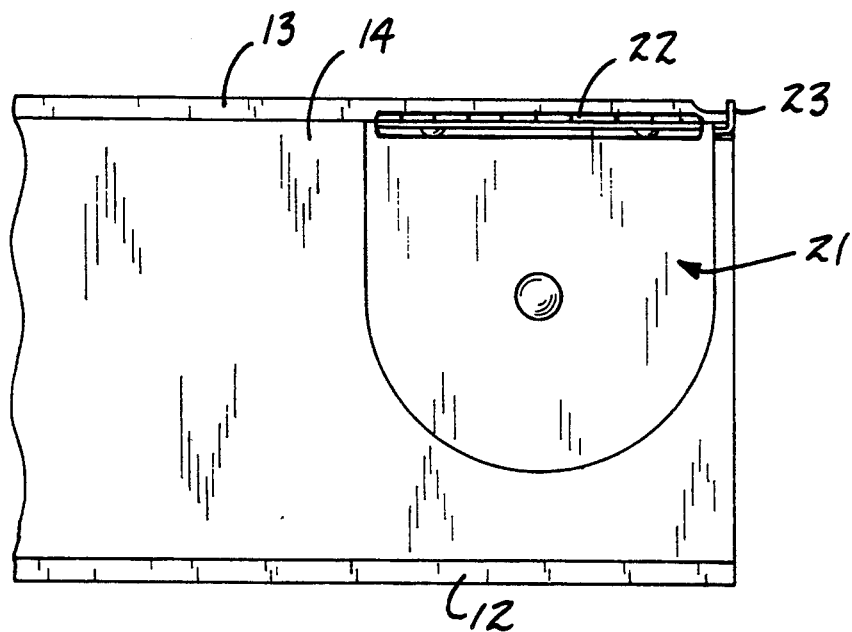
FIG. 6 is an orthographic top view of the measuring rule.

The FIGS. 5 and 6 indicate a measuring tape housing 21 hingedly mounted to the second wall flange 13 about a hinge 22. In this manner, the tape 23 may be displaced relative to the top wall 14.

Figure 7:
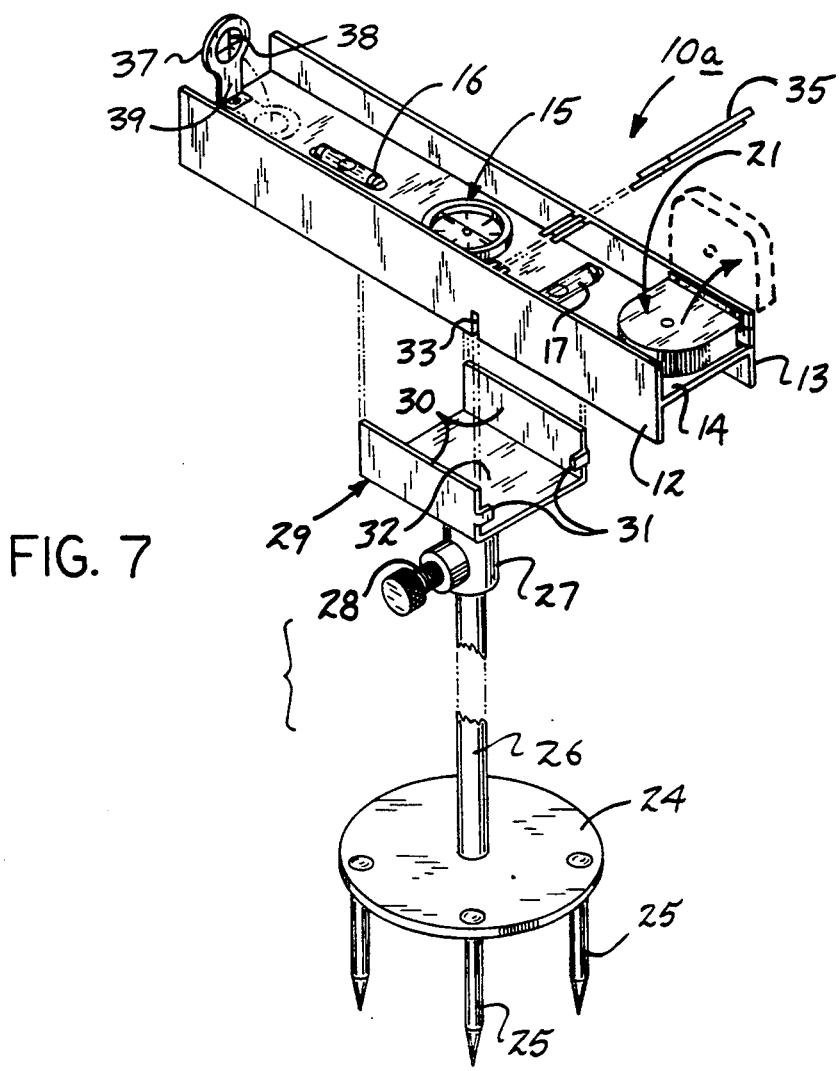
FIG. 7 is an isometric illustration of the measuring rule arranged and illustrated for pivoting relative to the central web in cooperation with a viewing structure for indicating horizontal alignment of various structural components.
Figure 8:
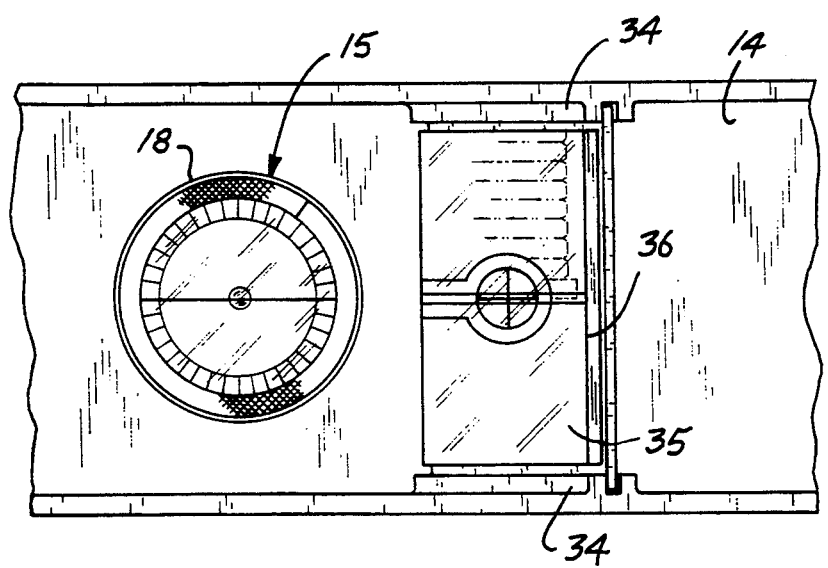
FIG. 8 is an orthographic top view of the translucent plate mounted within the level structure.

The FIG. 7 indicates the structure for use in the surveying of alignment of various components such as fence posts, as indicated in phantom in FIG. 8, such that spaced parallel guide tracks 34 are mounted into the first and second wall flanges 12 and 13 in a facing relationship and angularly oriented at an acute included angle relative to the web top wall 14 to receive a translucent plate 35 extending between the first and second wall flanges 12 and 13. A guide indicia line 36 is directed along the translucent plate parallel to the top wall 14. A sight ring 37 is provided, having cross hairs 38 therewithin, wherein the sight ring 37 is pivotally mounted relative to the top wall 14 about a sight ring hinge 39 permitting positioning of the sight ring in contiguous communication to the top wall 14, as illustrated in phantom in FIG. 7, as a first position, wherein in a second position, the sight ring is orthogonally oriented relative to the top wall 14.

Further, a U-shaped cradle 29 is provided, having cradle side walls 30 and a cradle floor 32, such that side wall tangs 31 extend from the side wall in a facing relationship over the floor 32. The tangs 31 are received within wall notches 33 of the wall flanges 12 and 13 to secure the level structure within the cradle 29. This apparatus 10a is further arranged to include a support shaft 26 fixedly mounted to a mounting plate 24 in an orthogonal relationship, wherein the mounting plate 24 includes a plurality of spikes 25 projecting to a bottom wall of the mounting plate 24 to permit the mounting plate to be secured within an underlying turf and the like. The support shaft 26 is received within a support tube 27 fixedly and orthogonally mounted to a bottom wall of the cradle floor 32, such that a lock rod 28 intersects the support shaft 26 to secure the cradle 29 in a predetermined rotative orientation relative to the mounting plate 24.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A level apparatus, comprising,
a central web, having a web planar top wall, with a first wall flange mounted fixedly and orthogonally to a first side of the central web, and a second wall flange fixedly and orthogonally mounted to a second side of the central web, wherein the first wall flange and the second wall flange are arranged in a parallel coextensive relationship relative to one another, with a first spirit level oriented parallel and medially of the first wall flange and the second wall flange secured within the central web, with a second spirit level orthogonally oriented relative to the first spirit level mounted within the central web,
and
a compass member mounted within the central web adjacent the first spirit level and the second spirit level, the compass member including a central compass housing, with the central compass housing including an outer housing ring rotatably mounted relative to the central compass housing, with the outer housing ring including a ring indicia radially directed of the central compass housing, the compass housing having a compass housing lens, the compass housing lens including a lens indicia member oriented parallel and between the first wall flange and the second wall flange, the housing ring includes an annular continuous array of ring teeth in a facing relationship relative to the central web top wall, and the central web top wall having a spring plate fixedly mounted to the web top wall extending in contiguous communication between a plurality of said teeth to secure the ring in a predetermined rotative orientation relative to the compass housing.

2. An apparatus as set forth in claim 1 including a measuring tape housing, having a measuring tape arranged for projection from the tape housing, and a tape housing hinge mounted to the tape housing and to the second wall flange to pivotally mount the tape housing relative to the second wall flange.

3. An apparatus as set forth in claim 2 including a mounting plate, the mounting plate including a mounting plate bottom wall having a plurality of spike members projecting therefrom, the mounting plate having a mounting plate top wall, with the top wall having a support shaft orthogonally mounted to the mounting plate top wall, and a U-shaped cradle, the U-shaped cradle including cradle side walls and a cradle floor, with the cradle floor having a socket fixedly and orthogonally mounted to the cradle floor extending below the floor, and the socket receiving the support shaft, and the socket further including a locking rod threadedly directed through the socket in communication with the support shaft, and the cradle side walls each having a tang member, wherein each tang member is arranged in a facing mirror image relationship relative to one another positioned over the cradle floor, and the first wall flange and the second wall flange each include a notch to receive an individual tang therewithin to position the central web over the cradle floor.

4. An apparatus as set forth in claim 3 including a plurality of guide tracks mounted between the first wall flange and the second wall flange, with the guide tracks in a facing mirror image relationship relative to one another canted at an acute included angle relative to the central web, and the guide tracks slidably receiving a translucent plate therewithin, and a sighting ring mounted to the central web spaced from the translucent plate, with the sighting ring having cross hairs, and the sighting ring having a sight ring hinge permitting displacement of the sighting ring from a first position in contiguous communication with the central web to a second position orthogonally oriented relative to the central web.

* * * * *